United States Patent Office 3,101,339
Patented Aug. 20, 1963

3,101,339
QUATERNARY SALTS OF NORMORPHINE
AND ITS ACYLATED DERIVATIVES
Karl Zeile and Kurt Freter, Ingelheim, Germany, assignors to C. H. Boehringer Sohn, Ingelheim (Rhine), Germany, a partnership
No Drawing. Filed Oct. 26, 1959, Ser. No. 858,556
Claims priority, application Germany Oct. 30, 1958
5 Claims. (Cl. 260—285)

This invention relates to new, therapeutically active quaternary salts of normorphine and of diacylated normorphine derivatives.

More particularly, the present invention relates to normorphinium compounds having the structural formula

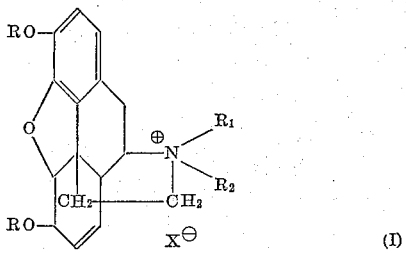

wherein
R is selected from the group consisting of acyl and hydrogen,
X is selected from the group consisting of chlorine, bromine and iodine, and
$R_1$ and $R_2$ are selected from the group consisting of propyl, allyl and propargyl.

The compounds having the structural Formula I above may most conveniently be prepared by reacting a normorphine compound of the formula

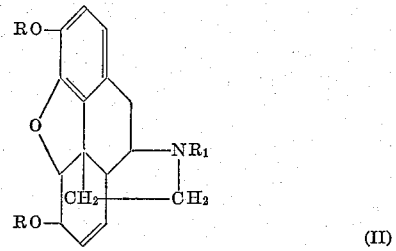

or

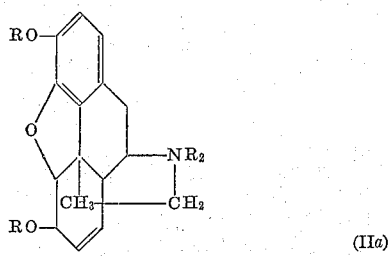

wherein R is hydrogen or a lower acyl radical and $R_1$ and $R_2$ are propyl, allyl or propargyl radicals, with a halide of the formula

or

wherein $R_1$ and $R_2$ have the meanings previously defined and X is a halogen selected from the group consisting of chlorine, bromine and iodine.

More particularly, the reaction between the compound of the Formula II or IIa and the halide of the Formula III or IIIa may be carried out in the presence of an inert solvent or without a solvent and at room temperature or elevated temperatures. If the reaction is carried out at elevated temperatures it is advantageous to let it proceed at the boiling point of the reaction mixture. The presence of an excess of the halide reaction component is always necessary, and if the reaction is carried out without a solvent the halide should be present in an amount of 10 to 15 times by weight of the normorphine compound II or IIa. The yield of purified reaction product is from 60 to 80% of theory.

If radicals $R_1$ and $R_2$ in Formula I are to be different, a reversal of the sequence of introduction of radicals $R_1$ or $R_2$ leads to stereoisomeric forms of compound I. For example, the reaction of N-propargyl-normorphine with allyl bromide as well as the reaction of N-allyl-normorphine with propargyl bromide yield quaternary salts which do not differ from each other either in their melting points or in their optical rotation values. A mixture of the reaction products of these two reactions does not exhibit a depression of the melting points of either of the reaction products alone. However, the two stereoisomers differ from each other in their characteristic bands of the infrared spectrum.

The following examples will illustrate the present invention and enable others skilled in the art to understand it more completely. However, it is to be understood that the invention is not limited to these illustrative examples.

EXAMPLE I
N-Diallyl-Normorphinimum Bromide 20 gm. N-allyl-normorphine and 300 gm. allyl bromide were refluxed for 12 hours, accompanied by stirring. The reaction mixture was then allowed to cool, the precipitate formed thereby was separated on a vacuum filter and the filter cake was washed with ether. The raw reaction product was obtained with a virtually quantitative yield. The raw product was recrystallized from boiling alcohol by adding chloroform. The purified product was found to have the structural formula

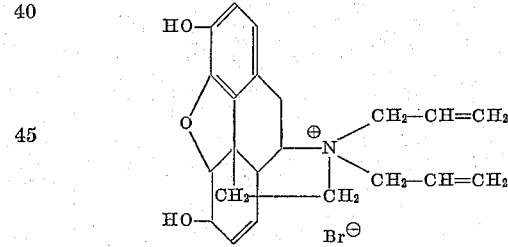

and a melting point of 190° C. (decomposition). The yield was 21 gm., which is 75% of theory. It was readily soluble in water.

EXAMPLE II
N-Diallyl-Normorphinium Iodide 20 gm. N-allyl-normorphine were dissolved in 200 cc. chloroform. 50 gm. allyl iodide were added to the resulting solution, and the mixture was allowed to stand at room temperature. After a few hours of standing a precipitate formed which was separated from the reaction mixture and purified as described in Example I. The purified product was found to have the structural formula

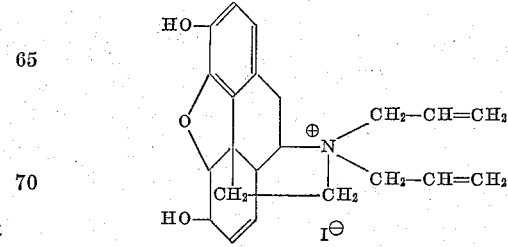

EXAMPLE III

*Diacetyl-N-Diallyl-Normorphinium Bromide*

A mixture of 20 gm. diacetyl-N-allyl-normorphine and 200 gm. allyl bromide was heated at 70° C. for 12 hours. The precipitate formed thereby was separated from the reaction mixture and was then recrystallized from chloroform. The product was found to be practically pure diacetyl-N-diallyl-normorphinimum bromide of the formula

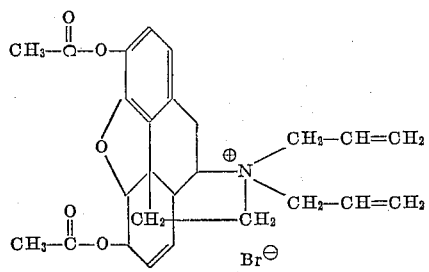

having a melting point of 188° C. The yield was 21 gm., which is 80% of theory.

EXAMPLE IV

*Dipropionyl-N-Diallyl-Normorphinium Bromide*

A mixture of 20 gm. dipropionyl-N-allyl-normorphine and 200 gm. allyl bromide was heated and thereafter worked up as described in Example III. Analysis of the purified product showed that it had the structural formula

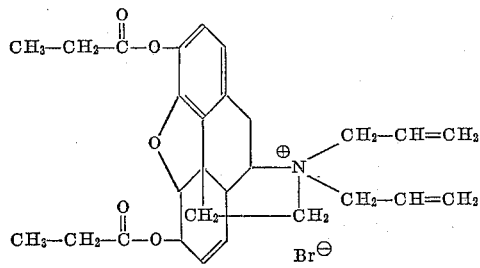

and a melting point of 190 to 193° C. The yield was 80% of theory.

EXAMPLE V

*N-Propargyl-N-Allyl-Normorphinium Bromide*

A mixture of 20 gm. N-propargyl-normorphine and 200 gm. allyl bromide (weight ratio 1:10) was refluxed for 12 hours. Some of the reaction product precipitated out during refluxing, but the precipitation was brought to completion by cooling the reaction mixture subsequent to the refluxing period. The precipitate was separated by vacuum filtration and was then recrystallized from water. The purified reaction product was found to have the structural formula

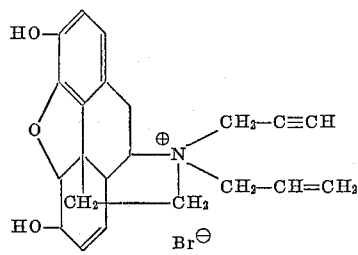

a melting point of 185 to 186° C. (decomposition), an optical rotation $[\alpha]_D^{26} = -99° \pm 1°$ (c.=1%, methanol) and a molecular weight of 430.1.

Calculated: N, 3.3%; Br, 18.6%. Found: N, 3.1%; Br, 19.0%.

The yield was from 60 to 70% of theory.

A compound having the same analytical values was obtained when a mixture of 20 gm. N-allyl-normorphine and 160 gm. propargyl bromide (weight ratio 1:8) was refluxed for 12 hours in 300 gm. acetone and the crystalline precipitate formed thereby was recrystallized from water.

EXAMPLE VI

*N-Dipropargyl-Normorphinium Bromide*

A mixture of 20 gm. N-propargyl-normorphine and 160 gm. propargyl bromide (weight ratio 1:8) was refluxed in 300 gm. acetone and worked up as described in Example V. The reaction product was found to have the structural formula

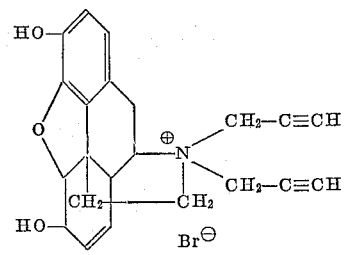

and a melting point of 182° C. (recrystallized from water). Its molecular weight was 428.1.

Calculated: N, 3.3%; Br, 18.6%. Found: N, 3.1%; Br, 19.0%.

EXAMPLE VII

*3,6-Diacetyl-N-Propyl-N-Allyl-Normorphinium Bromide*

A mixture of 20 gm. diacetyl-N-propyl-normorphine and 200 gm. allyl bromide was refluxed and worked up as described in Example V, except that the raw reaction product was recrystallized from a mixture of chloroform and ether (1:1). The purified reaction product was found to have the structural fomula

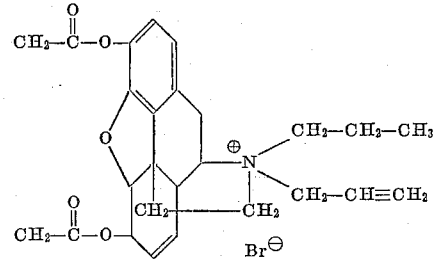

and a melting point of 170° C.

Analysis: $C_{26}H_{32}O_5NBr$, $H_2O$; mol. wt. 536.3. Calculated: C, 58.2%; H, 6.3%; N, 2.6%. Found: C, 57.7% H, 6.6%; N, 2.6%.

EXAMPLE VIII

*N-Propargyl-N-Propyl-Normorphinium Bromide*

A mixture of 20 gm. N-propyl-normorphine and 200 gm propargyl bromide (weight ratio 1:10) in 200 gm. acetone was refluxed for 16 hours. The reaction mixture was then allowed to cool, the precipitate formed thereby was separated on a vacuum filter, the filter cake was washed with ether and recrystallized from water. The purified reaction product was found to have the structural formula

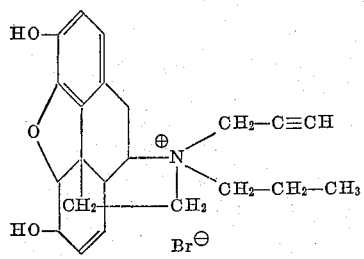

and a melting point of 190 to 193° C.

EXAMPLE IX

N-Dipropyl-Normorphinium Iodide

A mixture of 20 gm. N-propyl-normorphine and 200 gm. propyl iodide was refluxed as described in Example VIII, and the raw reaction product was recrystallized from alcohol/ether. The purified product was found to have the structural formula

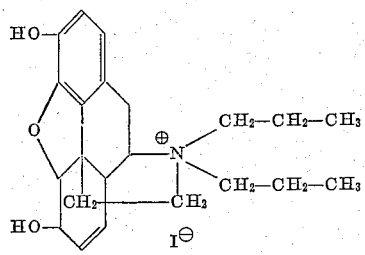

and a melting point of 172 to 179° C. (decomposition).

EXAMPLE X

N-Diallyl-Normorphinium Chloride

A mixture of 1 part by weight N-allyl-normorphine, 10 parts by weight acetone and 10 parts by weight allyl chloride was boiled for 24 hours. The reaction mixture was cooled and the precipitate formed thereby was separated by vacuum filtration, washed with ether and recrystallized from water. The purified reaction product was found to have the structural formula

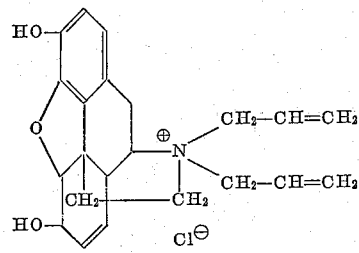

and a melting point of 179° C.

EXAMPLE XI

3,6-Diacetyl-N-Propyl-N-Propargyl-Normorphinium Bromide

A mixture of 10 gm. diacetyl-N-propyl-normorphine and 200 gm. propargyl bromide was boiled for 6 hours. The reaction mixture was then cooled and introduced into six times its weight of ether. A precipitate formed which was separated and recrystallized from water. The purified reaction product was found to have the structural formula

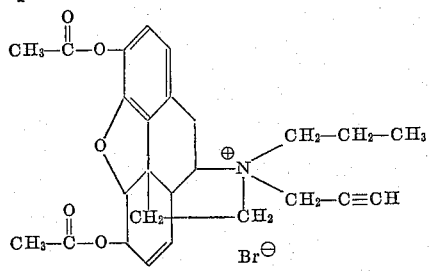

and a melting point of 160 to 165° C. (decomposition).

The compounds embraced by formula I above have unexpected and useful pharmacological properties; more particularly, they are highly effective antagonists against the analgesic action of morphine and, when administered alone, they act as analgesics.

It is known that N-allyl-normorphine has an antagonistic effect against the analgesic activity of morphine, and that by itself it exhibits analgesic acitvity. However, the practical use of N-allyl-normorphine as a pharmacological agent is seriously restricted by the numerous side effects which it produces, such as restlessness, nausea and hallucinations.

The compounds according to the present invention are not only much more effective morphine antagonists but in addition do not produce any undesirable side effects of any kind.

To demonstrate the more effective antagonistic activity of the compounds disclosed herein against the analgesic effect of morphine, the following comparative tests were made:

A given number of mice were divided into two groups comprising an equal number of mice. The mice of the first group were given subcutaneous injections of solutions containing varying quantities of morphine and N-allyl-normorphine. After each injection each mouse was examined by the method of Haffner, Deutsche Medizinische Wochenschrift 54, 731 (1929), to determine the presence of detectable analgesia. The mice of the second group were treated and examined in analogous fashion, except that the injected solution contained varying amounts of morphine and N-diallyl-normorphinium bromide.

The following table shows the results of these comparative tests. The left-hand column indicates the amounts of morphine and N-allyl-normorphine or N-diallyl-normorphinium bromide in the injected solutions, and the right-hand column indicates, in percentage terms, the number of mice in which the presence of detectable analgesia was found.

Subcutaneously injected mixture:

| | Portion of treated mice with detectable analgesia, percent |
|---|---|
| 2.5 mg./kg. morphine+2.5 mg./kg. N-allyl-normorphine | 0 |
| 5 mg./kg. morphine+5 mg./kg. N-allyl-normorphine | 20 |
| 10 mg./kg. morphine+10 mg./kg. N-allyl-normorphine | 10 |
| 15 mg./kg. morphine+15 mg./kg. N-allyl-normorphine | 10 |
| 20 mg./kg. morphine+20 mg./kg. N-allyl-normorphine | 0 |
| 2.5 mg./kg. morphine+2.5 mg./kg. N-diallyl-normorphinium bromide | 0 |
| 5 mg./kg. morphine+5 mg./kg. N-diallyl-normorphinium bromide | 0 |
| 10 mg./kg. morphine+10 mg./kg. N-diallyl-normorphinium bromide | 0 |
| 15 mg./kg. morphine+15 mg./kg. N-diallyl-normorphinium bromide | 0 |
| 20 mg./kg. morphine+20 mg./kg. N-diallyl-normorphinium bromide | 0 |

The results of these tests tabulated above clearly showed that the representative compound according to the present invention is by far more effective as antagonist against the analgesic action of morphine than N-allyl-normorphine.

For therapeutic administration in dosage form the compounds embraced by Formula I above may be compounded with suitable non-toxic, inert liquid or solid pharmaceutical carriers to produce ampules, tablets and the like. The following examples illustrate the composition of typical pharmaceutical preparations suitable for administration of the compounds in dosage form.

EXAMPLE XII

Ampules:
N-diallyl-normorphinium bromide____gm__ 0.0400
Sodium chloride_____gm__ 0.0056
Double distilled water (adjusted to a pH of 3.1 with HCl), q.s. ad. 1.0 ml.

EXAMPLE XIII

Tablets: gm.
N-diallyl-normorphinium bromide_____ 0.050
Lactose _____ 0.105
Corn starch_____ 0.130
Soluble starch_____ 0.030
Finely divided $SiO_2$_____ 0.002
Magnesium stearate_____ 0.003

Total weight of tablet_____ 0.320

The effective single dosage of the compounds in human therapy is 20 to 120 mg., and preferably 40 to 100 mg.

While we have illustrated the present invention with the aid of specific representative embodiments, it will be apparent to those skilled in the art that the present invention is not limited to those embodiments and that various changes and modifications may be made without departing from the spirit of the invention or the scope of the appended claims.

We claim:
1. N-substituted normorphinium compounds having the structural formula wherein
R is selected from the group consisting of hydrogen and lower alkanoyl,
$R_1$ and $R_2$ are selected from the group consisting of propyl, allyl and propargyl, and
X is selected from the group consisting of chlorine, bromine and iodine.
2. N-diallyl-normorphinium bromide.
3. Diacetyl-N-diallyl-normorphinium bromide.
4. N-propargyl-N-allyl-normorphinium bromide.
5. N-dipropargyl-normorphinium bromide.

References Cited in the file of this patent

UNITED STATES PATENTS

| | | |
|---|---|---|
| 2,364,833 | Weijlard et al. | Dec. 12, 1944 |
| 2,619,485 | Chabrier et al. | Nov. 25, 1952 |
| 2,741,609 | Weijlard | Apr. 10, 1956 |
| 2,928,768 | Freedman et al. | Mar. 15, 1960 |
| 2,967,130 | Sanders et al. | Jan. 3, 1961 |

FOREIGN PATENTS

| | | |
|---|---|---|
| 755,521 | Great Britain | Aug. 22, 1956 |

OTHER REFERENCES

Braun: Berichte, volume 49, page 987 (1916).
Winter et al.: Archives Internationales de Pharmacodynamie et al. Therapie, volume 110, pages 186–200 (1957).